US008001493B2

(12) United States Patent
Joshi et al.

(10) Patent No.: US 8,001,493 B2
(45) Date of Patent: Aug. 16, 2011

(54) EFFICIENT METHOD AND COMPUTER PROGRAM FOR MODELING AND IMPROVING STATIC MEMORY PERFORMANCE ACROSS PROCESS VARIATIONS AND ENVIRONMENTAL CONDITIONS

(75) Inventors: Rajiv V. Joshi, Yorktown Heights, NY (US); Anirudh Devgan, Austin, TX (US)

(73) Assignee: International Business Machines, Armonk, NY (US)

( * ) Notice: Subject to any disclaimer, the term of this patent is extended or adjusted under 35 U.S.C. 154(b) by 416 days.

(21) Appl. No.: 12/199,161

(22) Filed: Aug. 27, 2008

(65) Prior Publication Data
US 2008/0319717 A1 Dec. 25, 2008

Related U.S. Application Data

(63) Continuation of application No. 11/077,313, filed on Mar. 10, 2005, now abandoned.

(51) Int. Cl.
*G06F 17/50* (2006.01)
(52) U.S. Cl. ............ 716/54; 716/56; 716/111; 716/112; 716/132; 716/133
(58) Field of Classification Search ............. 716/54, 716/56, 106, 111, 112, 132, 133, 134, 135; 703/13, 19, 20
See application file for complete search history.

(56) References Cited

U.S. PATENT DOCUMENTS

| | | | |
|---|---|---|---|
| 5,392,227 A | 2/1995 | Hiserote | |
| 6,035,115 A | 3/2000 | Suzuki | |
| 6,321,183 B1 | 11/2001 | Tatsumi | |
| 6,625,785 B2 | 9/2003 | Chatterjee et al. | |
| 6,978,229 B1 | 12/2005 | Saxena et al. | |
| 2003/0037306 A1 | 2/2003 | Gutwin et al. | |
| 2003/0115035 A1 | 6/2003 | Kulshreshtha et al. | |
| 2003/0163297 A1 | 8/2003 | Khaira et al. | |
| 2005/0044515 A1 | 2/2005 | Acar et al. | |
| 2005/0226031 A1 | 10/2005 | Najim et al. | |
| 2005/0273308 A1* | 12/2005 | Houston | 703/14 |
| 2005/0288918 A1 | 12/2005 | Chen et al. | |
| 2006/0101355 A1 | 5/2006 | Ciplickas et al. | |
| 2007/0044049 A1 | 2/2007 | Adams et al. | |

OTHER PUBLICATIONS

"Statistical Design and Optimization of SRAM Cell for Yield Enhancement", by Saibal Mukhopadhyay, Hamid Mahmoodi, and Kaushik Roy, pp. 10-13, IEEE, @2004.*
Office Action in U.S. Appl. No. 11/077,313 dated Jan. 28, 2008.
Office Action in U.S. Appl. No. 11/077,313 dated Jul. 25, 2008.

* cited by examiner

*Primary Examiner* — Paul Dinh
*Assistant Examiner* — Nha T Nguyen
(74) *Attorney, Agent, or Firm* — Mitch Harris, Atty at Law, LLC; Andrew M. Harris; Libby Z. Toub

(57) ABSTRACT

An efficient method and computer program for modeling and improving stating memory performance across process variations and environmental conditions provides a mechanism for raising the performance of memory arrays beyond present levels/yields. Statistical (Monte-Carlo) analyses of subsets of circuit parameters are performed for each of several memory performance variables and then sensitivities of each performance variable to each of the circuit parameters are determined. The memory cell design parameters and/or operating conditions of the memory cells are then adjusted in conformity with the sensitivities, resulting in improved memory yield and/or performance. Once a performance level is attained, the sensitivities can then be used to alter the probability distributions of the performance variables to achieve a higher yield. Multiple cell designs can be compared for performance, yield and sensitivity of performance variables to circuit parameters over particular environmental conditions in order to select the best cell design.

20 Claims, 7 Drawing Sheets

EFFICIENT METHOD AND COMPUTER PROGRAM FOR MODELING AND IMPROVING STATIC MEMORY PERFORMANCE ACROSS PROCESS VARIATIONS AND ENVIRONMENTAL CONDITIONS

The present U.S. patent application is a Continuation of U.S. patent application Ser. No. 11/077,313 filed on Mar. 10, 2005.

BACKGROUND OF THE INVENTION

1. Technical Field

The present invention relates generally to memory circuit design methodologies and programs for designing digital memory circuits, and more particularly to a method and computer program for improving static memory performance across process variations and environmental conditions.

2. Description of the Related Art

Memory speed and other performance factors are critical limitations in today's processing systems and are predicted to become even more of a critical limitation as technologies move forward. In particular, static random access memories (SRAMS) and memory cells are used in processor caches, registers and in some designs external to the system processors for fast access to data and program instructions.

With processor cycle frequencies reaching well above 4 Ghz, development of SRAM cells that can store and provide access to stored values within that period has become necessary. However, at process scales necessary to achieve such access are also increasingly subject to variability in circuit parameters such as device threshold voltages and channel dimensions. Charge history effect and physical nano-scale effects due to non-ideal materials also come increasingly into place as device size is decreased.

Semiconductor memories in general are also becoming the predominant power consumer in almost every processing system and particularly in processors, cache memory is a major consumer of power. As such, reduction of SRAM cell power supply voltages is highly desirable, as power dissipation and overall power requirements are dictated by the supply voltages used. However, lower supply voltages typical dictate lower performance levels in terms of cell read and write stability and access delay.

Because of all of the above-described limitations, yield reduction due to SRAM cell variability or increased redundancy requirements will increase production cost and waste or limit available space and design flexibility in order to provide sufficient redundancy to maintain yields.

Present analysis techniques require large amounts of processing power to extend an accurate yield/performance analysis beyond three standard deviations ($3\sigma$) of device parameter variations. However, if it were practical to perform more extensive analyses and further if a technique for determining which design parameters can be efficaciously altered were provided, memory device designs could be improved beyond present levels and designs for much higher operating frequencies could be generated.

It is therefore desirable to provide a method for modeling and improving SRAM cell performance across process variations and environmental operating conditions in an efficient manner so that device parameter variations can be simulated to a level of $5\sigma$ and beyond.

SUMMARY OF THE INVENTION

The objective of improving SRAM cell performance over process variations and environmental conditions are achieved by methods that analyze SRAM cell performance for one or multiple cell designs, predict yields with respect to performance variables and the optionally and iteratively adjust cell design parameters to optimize performance and yield.

The methods may be embodied in program instructions executing within a workstation computer and also in a computer program product comprising media for storing the program instructions for execution within a workstation computer system.

One aspect of the invention represents an improvement over traditional memory cell modeling, as multiple statistical analyses are performed on only a subset of circuit parameters for each of several performance variables, while other parameters are fixed. The subset of circuit parameters are also varied systematically over the multiple analyses so that sensitivities can be determined. The results of the statistical analyses are used to compute sensitivities of the performance variables to the cell parameters and the cell parameters and/or operating conditions are adjusted in conformity with the sensitivities in order to improve the memory cell design.

An initial pass of the analysis may be performed with a statistical analysis with respect to the entire set of circuit parameters and devices, in order to determine an initial set of sensitivities. Examination of the sensitivities (e.g., comparison of the sensitivities to a threshold value) is then used to eliminate devices/parameters from the subsequent analyses.

Because of the above-described technique, it is possible to extend the analysis beyond a traditional analysis that would extend to only $3\sigma$ (three standard deviations) to a level of $5\sigma$ and beyond for at least some of the parameters, increasing device yields. The increase in analysis speed (i.e., reduction in processing power requirements) makes it possible, for example, to extend an analysis to a level of $6\sigma$ or $7\sigma$. Since the cells are not modeled over every device parameter, but only the parameters critical to the particular performance variable being modeled, computation time is reduced and sensitivities can be more effectively determined.

Another aspect of the invention provides for selecting a best cell design or cell order by simultaneously modeling several cell designs, whereby the yield and yield distribution of performance variables can be compared and optimized for selecting the best cell design for a given range of environmental conditions and process variable statistics.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
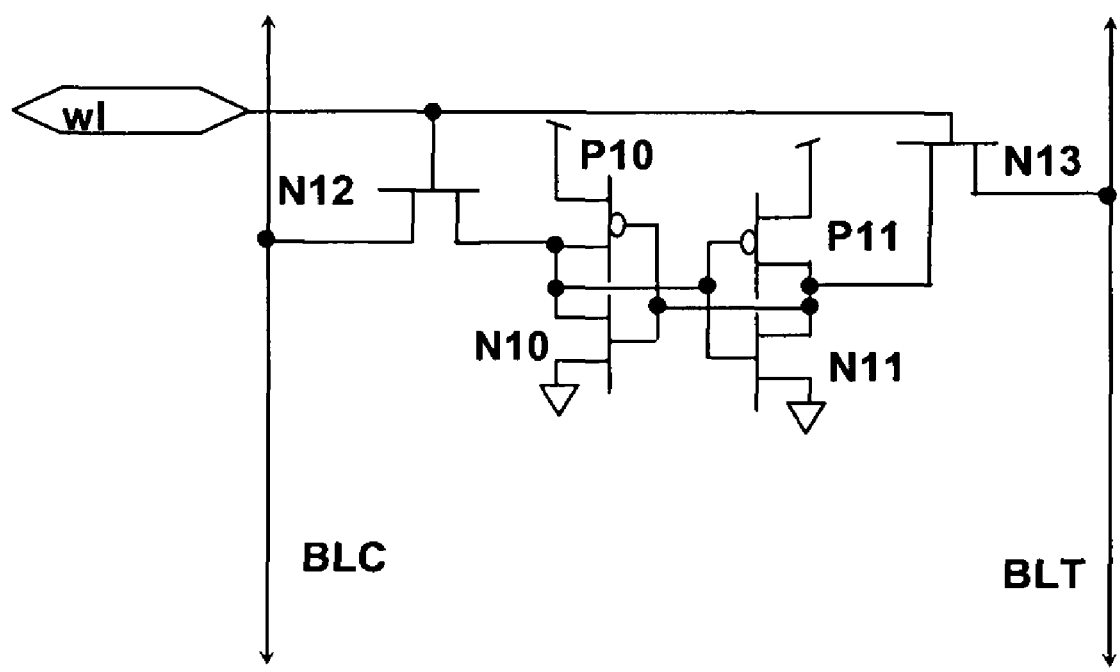
FIG. 1 is a schematic diagram of a memory cell that can be modeled in accordance with an embodiment of the invention.

With reference now to the figures, and in particular with reference to FIG. 1, a memory cell that can be modeled by a method in accordance with an embodiment of the invention is shown. Transistors P10, N10, P11 and N11 form a cross-coupled static latch that provides the storage of a value in the cell. Transistors N12 and N13 provide for access to the value in response to a wordline select signal WL. Bitlines BLT (true bitline) and BLC (complement bitline) couple all cells in a column, so that when a row is selected by signal WL, only one row cell from each column is exposed to the memory logic. For a write operation, bitlines BLC and BLT are charged to voltages corresponding to the desired state of the memory cell and WL is activated (pulsed), setting the state of the latch formed by transistors P10, N10, P11 and N11. For a read operation, the bitlines BLC and BLT are previously charged to opposite state predetermined voltages (generally $V_{dd}$ and ground), and to commence the read, WL is pulsed and a sense amplifier coupled to bitlines BLC and BLT determines the stored state by differential comparison of bitlines BLC and BLT.

The two different operations detailed above are impacted in different ways by variations in the parameters of transistors P10-11 and N10-13. The variations lead to unstable (potentially erroneous) read and write operations when the variations rise above a certain level. As operating frequencies are increased and device sizes correspondingly decreased, the variations take on a statistically significantly greater range causing failure of an increasing number of devices in a lot. The present invention is directed toward an efficient method for statistically analyzing the design of memory cells so that yields may be improved by selecting nominal values for the device parameters and environmental operating ranges or optimum operating points (such as power supply voltage ranges, power supply optimum value or temperature ranges) can be determined for a specific design. The analysis is performed on subsets of devices within the memory cell for each performance variable being evaluated. Multiple Monte-Carlo analyses are performed with systematic variations in the parameters in the subset for each performance variable, so that sensitivities of the performance variables to the associated parameters can be obtained. The systematic variations can be performed directly by adjusting the mean value input to each parameter (i.e., the nominal design value of the parameter such as the design $V_T$ value for a particular transistor).

The subsets of devices can be selected in advance by foreknowledge of the devices critical to a given performance variable, or an initial pass of Monte-Carlo analyses can be performed on the entire cell to determine the critical devices by the level of sensitivity of a performance variable to the parameters of the critical devices. Parameters (and entire devices) for which the sensitivity falls below a threshold can be eliminated from subsequent iterations by fixing rather than varying those parameters. The result is a reduction in processing time and memory requirements for subsequent iterations.

In particular, with respect to the memory cell depicted in FIG. 1, when the stored value is a logical "0" (with respect to the bitline values), the common channel connection of transistors P10 and N10 is near $V_{dd}$. When a logical "1" is written to the cell, if transistors N12 and N10 are "weak" (i.e., high resistance) and/or transistor P10 is "strong" (i.e., low resistance) the write operation can fail to change the state of the memory cell. For a read operation, if transistor N11 is weak and transistors P11 and/or N13 are strong, a read operation may change the state of the cell. When the value stored in the memory cell is a logical "1", the critical transistor sets are reversed, with variations in transistors N12, N10 and P10 causing potential failure of the write operation and variations transistors N11, N13 and P11 causing potential failure of the read operation. However, since the design and process are symmetrical, it is not necessary to analyze both conditions. While the devices themselves will not be symmetrical, the statistical analysis applies to both conditions, because the statistics of the devices, e.g. the nominal design values and ranges should be the same.

Because of the above determination that certain devices are critical to certain operations, the device parameters: $V_{th}$ (transistor threshold voltage), W (channel width) and L (channel length) can be statistically simulated for just those devices for a particular performance variable such as read stability, write stability, read and write delays or noise on internal cell nodes.

By reducing the amount of analysis that must be performed to determine whether or not a memory cell design will fall below a certain yield, two goals are accomplished: the amount of computation time required is managed; and greater separation of particular device parameter variations with respect to the variation of performance variables becomes possible. By separating the device parameter variations, nominal values of the device parameters can be more effectively determined and traded-off and other factors such as environmental ranges or nominal operating points can be determined.

While the illustrated cell is an example of a cell of order 4 that may be analyzed and improved by a method according to an embodiment of the invention, it should be understood that the techniques illustrated herein may be applied to memory cells of any order. (Order as used herein refers to the number of devices that implement the storage element of the cell exclusive of the bitline buffer transistors.)

Further, the present invention can be used to obtain information about what device parameters are more critical to performance variable stability by performing a sensitivity analysis on the results of the statistical simulations. For example, power consumption can be reduced by studying leakage effects in subsets of devices within the cell and determining the sensitivity of leakage current to the various device parameters for the subset.

Also, the present invention can be used to analyze the yield for one or more cell designs based on the performance variable criteria, with or without iterating or changing the cell design. For example, cells of device count {1, 2 ... 8} and so on may be simultaneously analyzed in order to select the best performance parameter yield for a given set of environmental conditions and process variations.

Also, when optimizing the cell designs by changing cell parameters, the determined cell parameter to performance variable sensitivities can be used to alter not only the mean values of the performance variable distributions, but the performance variable distributions can be forced to asymmetrical distributions (having a higher overall device count on the desired side of a performance criteria) in order to improve yield.

Figure 2:
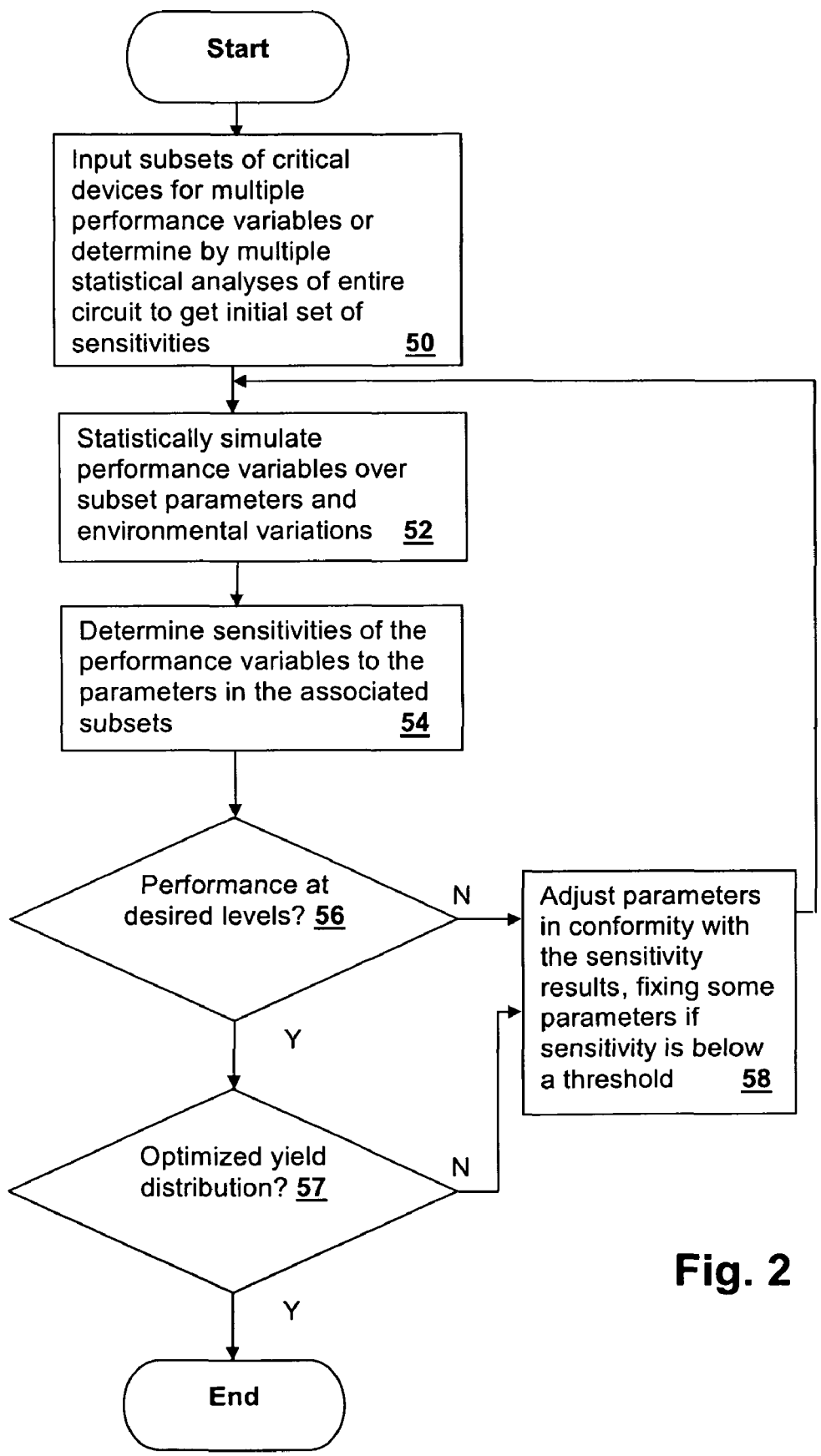
FIG. 2 is a flowchart depicting a method in accordance with an embodiment of the present invention.

Referring now to FIG. 2, a method in accordance with an embodiment of the present invention is depicted. First, subsets of devices for each performance variable to be studied are determined (step 50) and then multiple statistical simulations (e.g., Monte-Carlo analyses) are performed over the systematic variations of parameters studied for the devices in the subset (step 52). The subsets can be selected by intelligent observation such as the cell analysis described above that determined the particular devices affecting particular performance variables by observing operation of the circuit. Alternatively, a first pass of step 52 may be made where all of the devices' parameters are unconstrained (i.e., the first subset is the set of all device parameters) and then after determining sensitivities of the performance variables to the device parameters below in step 54, the subsets of devices for the first "improved" pass are selected as those devices for each performance variable for which the sensitivities are high.

Next, the sensitivity of each performance variable to the systematic parameter variations (parameter input statistics variation) for the subset associated with the performance variable is determined by determining the partial derivative of the performance variable with respect to the parameter variations (step 54) and for an iterative technique, a check can be made if performance is at desired levels (decision 56) (or other suitable check such as convergence at a fixed value) and if the check determines that further computation is desirable or required, the parameters in each subset can be adjusted in conformity with the determined sensitivities (step 58) and steps 50-56 are then repeated until decision 56 indicates termination of the process. Also, as indicated in the flowchart in step 58, some parameters can be fixed during iteration (and/or some devices can be removed from subsets, i.e., all of their parameters become fixed) when the sensitivity of particular performance variables to parameter variations (or the parameter variations for an entire device) is below a threshold.

Figure 3:
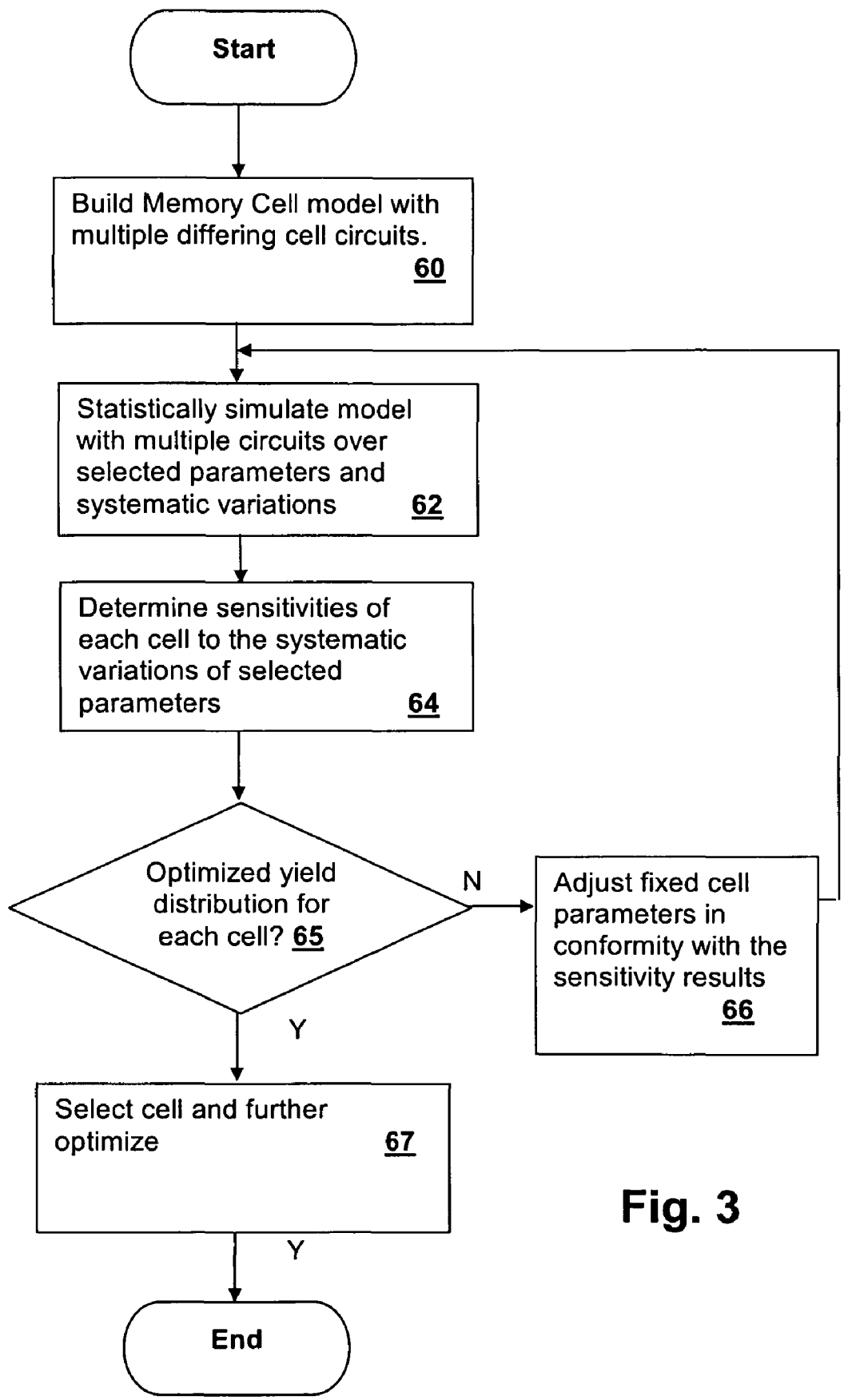
FIG. 3 is a flowchart depicting a method in accordance with another embodiment of the present invention.

Referring now to FIG. 3, a method in accordance with another embodiment of the present invention is illustrated in a flowchart. The illustrated method may be combined with the techniques illustrated in FIG. 2, or may be used alone. First, a memory cell model with multiple differing cell circuits (e.g., cells of device count 1 to N) is built in the input to the Monte-Carlo analyses (step 60). Then the model is simulated over subset parameter variations and environmental conditions (step 62). The sensitivities of each cell to the process parameters are then determined (step 64) and optionally, the process may be iterated in conformity with the sensitivity results (step 66), until the yield distribution is optimized for each cell (decision 66). At this point, the cell designs can be compared for yield of the performance variables and a cell design selected for further optimization (step 67) which may be performed by the method illustrated in FIG. 2.

Figure 4:
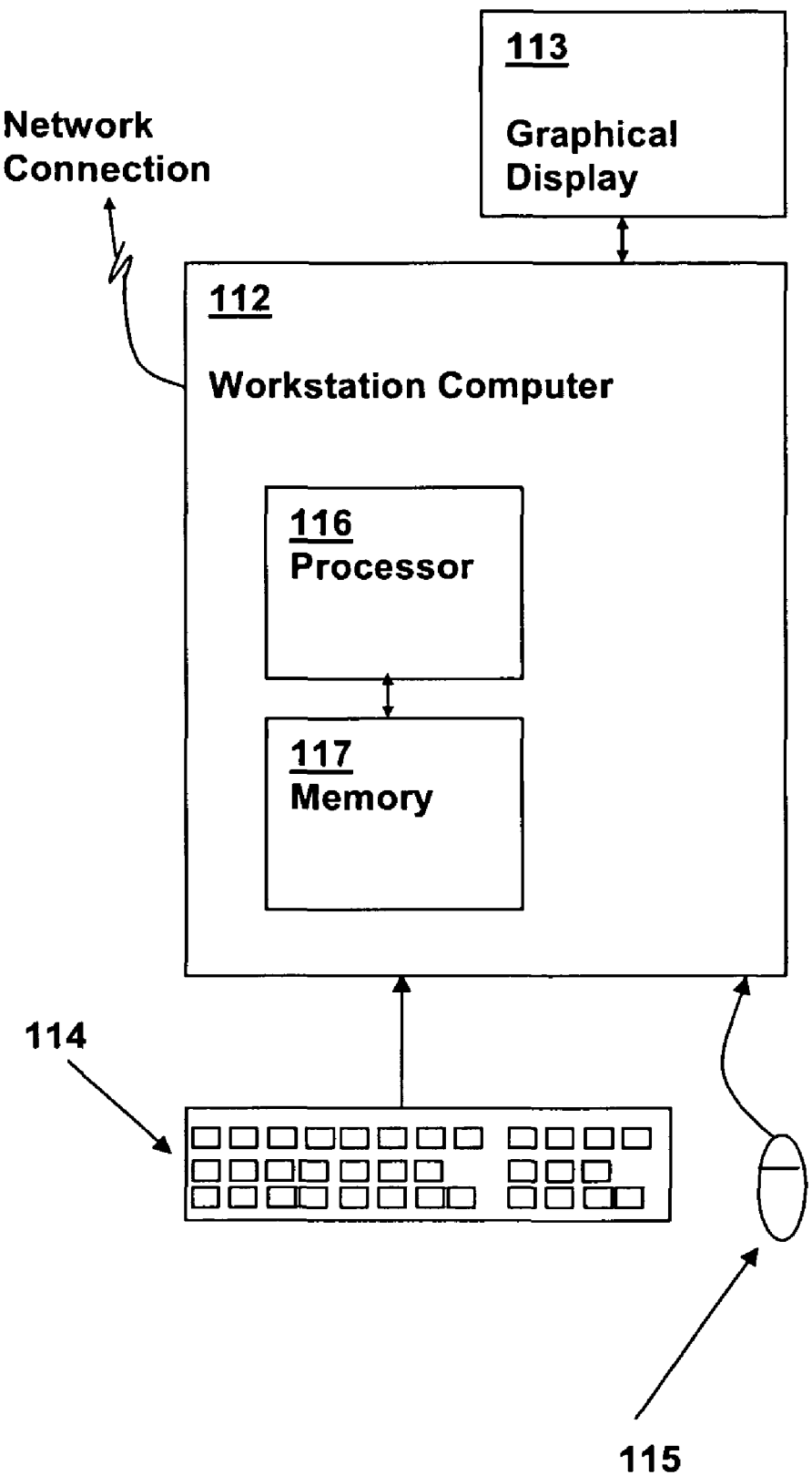
FIG. 4 is a pictorial diagram depicting a workstation computer system in which the methods of FIGS. 2 and 3 can be practiced by executing program instructions of a computer program product in accordance with an embodiment of the present invention.

Referring now to FIG. 4, a workstation computer system, in which methods according to an embodiment of the present invention are performed, is depicted. A workstation computer 112, having a processor 116 coupled to a memory 117, for executing program instructions from memory 117, wherein the program instructions include program instructions for executing one or more methods in accordance with an embodiment of the present invention, such as the method described above with respect to FIG. 2.

Workstation computer 112 is coupled to a graphical display 113 for displaying program output such as simulation results and circuit layout structure input, design and verification programs implementing embodiments of the present invention. Workstation computer 112 is further coupled to input devices such as a mouse 115 and a keyboard 114 for receiving user input. Workstation computer may be coupled to a public network such as the Internet, or may be a private network such as the various "intra-nets" and software containing program instructions embodying methods in accordance with embodiments of the present invention may be located on remote computers or locally within workstation computer 112.

Figure 5:
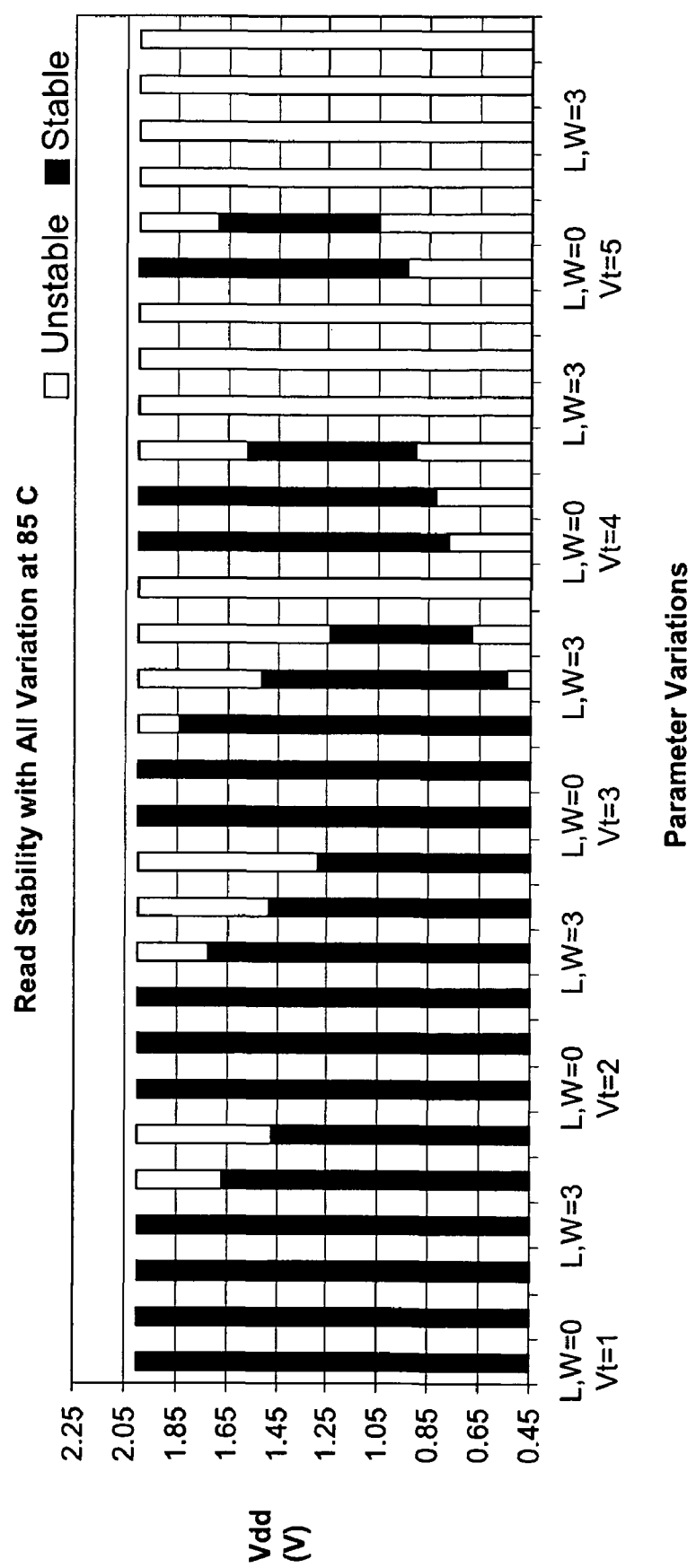
FIGS. 5, 6A-6B and 7 are bar graphs depicting results of analyses performed in accordance with embodiments of the present invention.

Referring now to FIG. 5, a graph depicting results of a method in accordance with an embodiment of the invention is shown. The graph depicts a Read Stability analysis result, where a Monte Carlo analysis of a cell output pass transistor such as N13 of FIG. 1 and half of the cross-coupled latch (transistors P11 and N11) were given statistics for dimensional variation (L,W) and threshold voltage variation. Moving across the graph from left to right, an integer change by standard deviation of threshold voltage is shown and within each change in threshold voltage variation, each bar represents an integer change in dimensional variation by standard deviation. All parameters were studied to the 5σ level.

The study was made across a supply voltage range of 0.45V to 2.25V and the dark portions of the bars indicate ranges where the read operation is stable. The following observations can be made: with only a variation in $V_{th}$, the memory cell is unstable for supply voltages under 0.9V. When both dimensional and $V_{th}$ variations are considered, a 4σ variation of the dimensions is tolerable up to a 3σ variation in threshold voltage.

Using the sensitivity results depicted in FIG. 5 iteration can be made as to process control (changing the input statistics) of the device parameters or nominal design values for the transistors in order to achieve a desired environmental range (such as supply voltage) or to extend the allowable deviation of device variations. Changes in the sensitivity results at each iteration can then be used to detect minima of the sensitivities versus changes in the nominal design parameters or process controls.

Figure 6A:
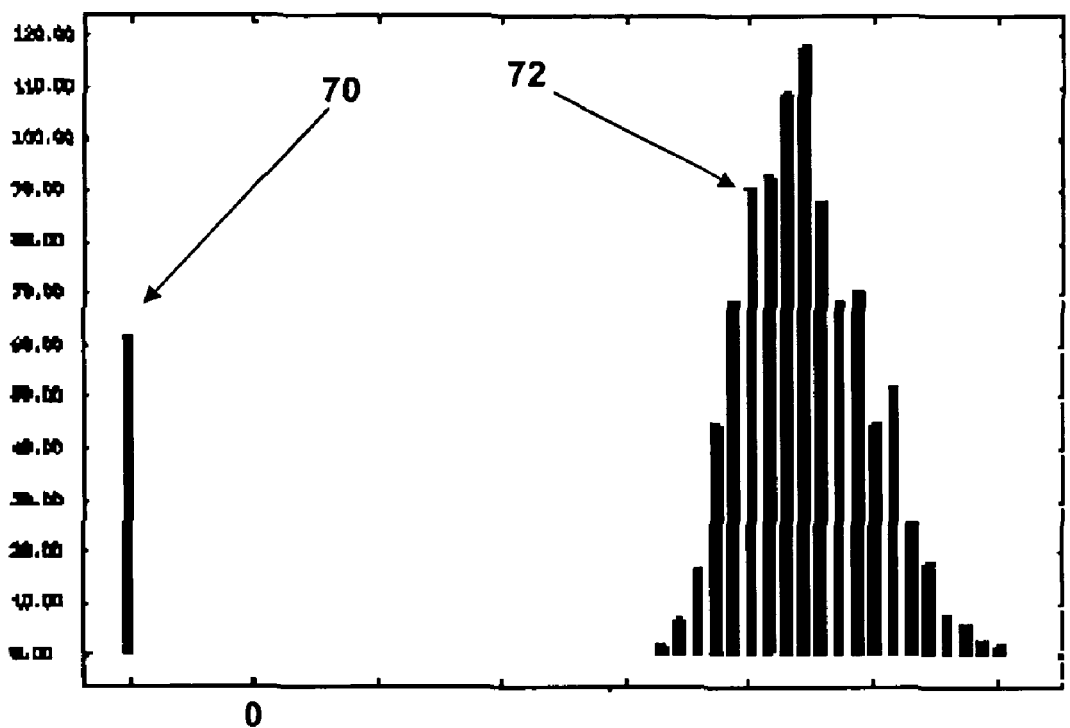
Figure 6B:
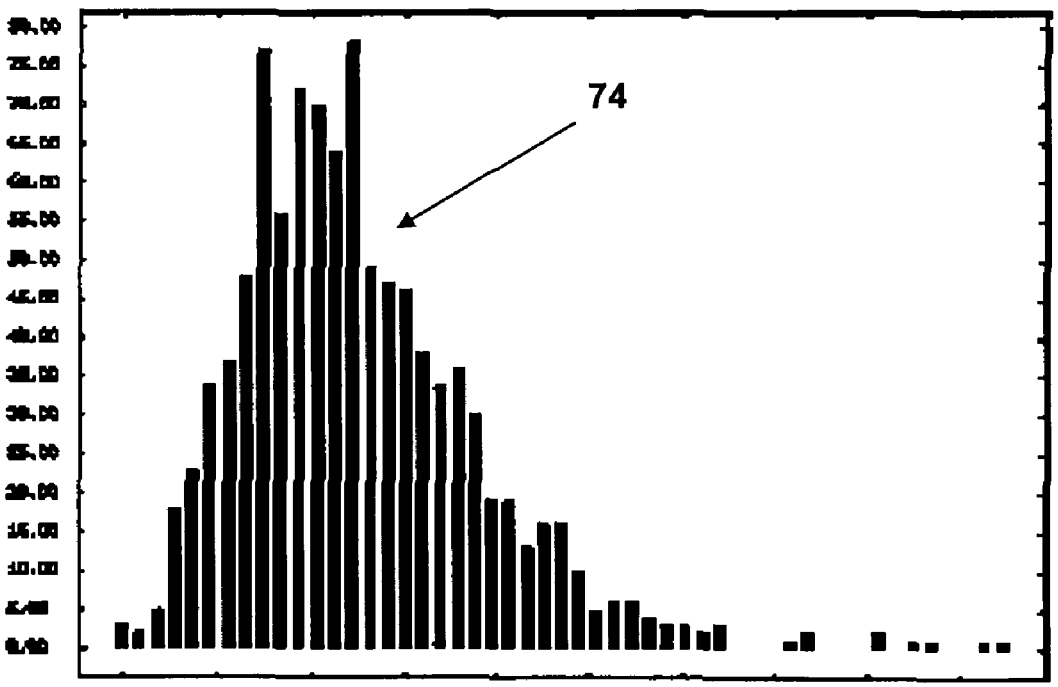

Referring now to FIGS. 6A and 6B, results of another analysis in accordance with an embodiment of the present invention is illustrated. FIG. 6A depicts a write delay distribution 72 and total failure count 70 (i.e., the sample count for cell parameters and conditions where the state of the cell never changed in response to a write operation). FIG. 6B shows a read delay distribution 74. By determining the sensitivities of the distributions (e.g., sensitivities of the performance variable mean, standard deviation and skew of the distribution to one side of the mean or the other), fixed parameters and mean values of varied parameters (i.e., those in the selected subsets) can be adjusted to change the shape and position of the distribution in order to improve performance and/or yield.

Figure 7:
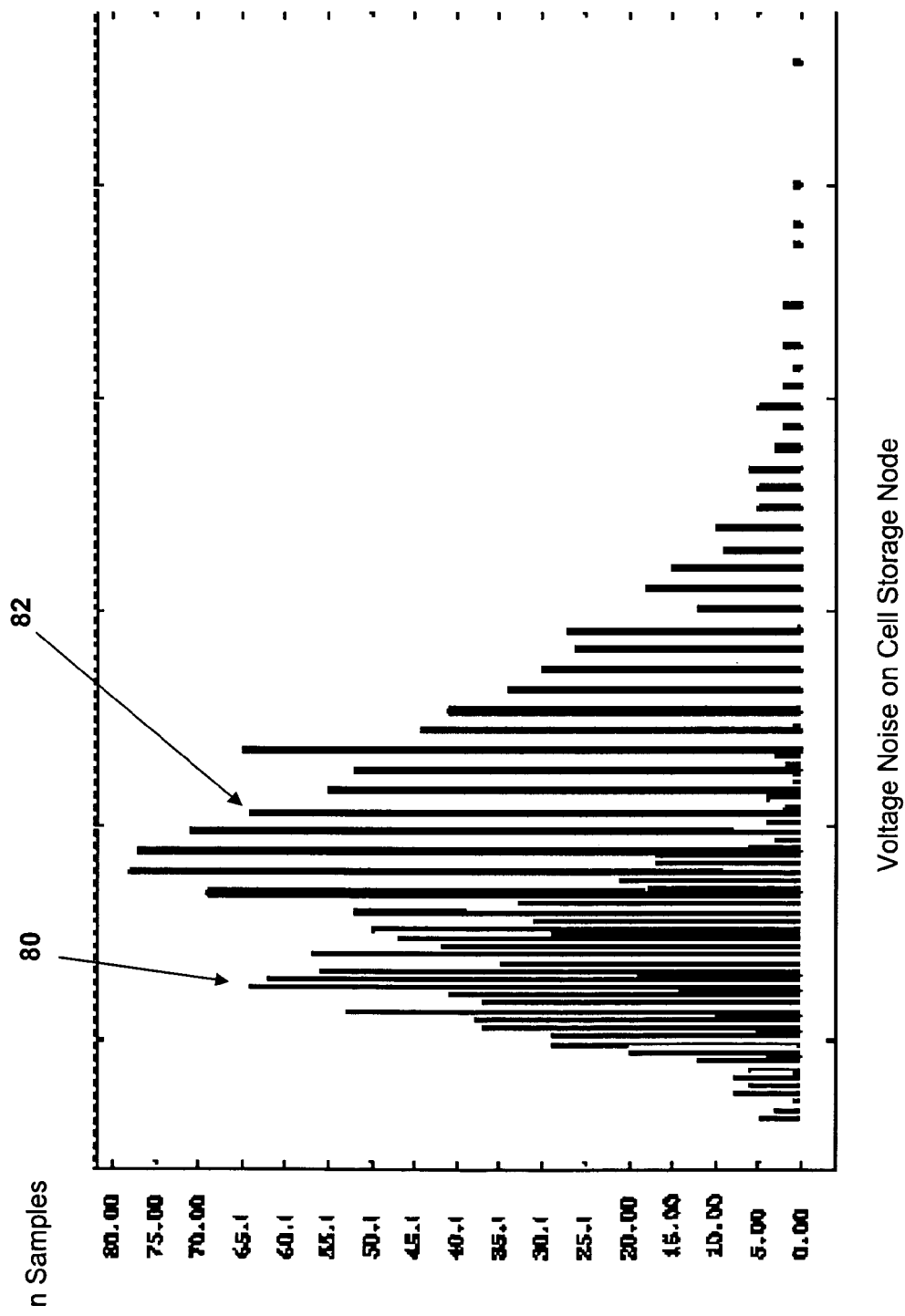

Referring now to FIG. 7, results of yet another analysis in accordance with an embodiment of the invention is depicted. Two distributions are shown for voltage noise on the internal storage node of a cell. Voltage noise on the storage node or other indicates cell instability in that an excessive excursion leads to a change of cell state. In the illustration, two distributions 80 and 82 are shown corresponding to voltage noise level distribution across quantities of two different cells with differing device counts. Each cell can be optimized according to the above-described iterative process, or one pass can be made and the cell design with the more desirable distribution (e.g., distribution 80) is selected and further optimized.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A computer-performed method for characterizing a design of a memory cell, comprising:
    pre-selecting subsets of circuit parameters of memory cell circuit elements, wherein the subsets correspond to a plurality of operational performance variables describing performance of the memory cell, wherein the subsets are pre-selected according to an expectation that first sensitivities of the operational performance variables to changes in the circuit parameters within their corresponding subsets are greater than second sensitivities of the performance variables with respect to changes in other circuit parameters that are not included in their corresponding subsets;
    determining values of statistical descriptors, including at least mean values, for the associated circuit parameters for simulation by a simulation program within a computer system;
    statistically simulating, by the computer program, the operational performance variables using the values of the statistical descriptors;
    repeating the statistically simulating, while systematically varying the circuit parameters in the corresponding subsets by adjusting their associated mean values and while maintaining the mean values associated with the circuit parameters that are not included within the subsets at fixed values across the multiple repetitions of the statistically simulating until the circuit parameters have been varied across corresponding predetermined ranges;
    computing the first sensitivities of the operational performance variables to the systematic variations of the mean values of the memory cell circuit parameters within their corresponding subsets from results of the statistically simulating by computing measures of partial derivatives of variations of the corresponding operational performance variables to the variations of the mean values of the memory cell circuit parameters; and
    storing the computed sensitivities in a memory of the computer system.

2. The method of claim 1, wherein the pre-selecting is performed by:
    performing multiple statistical analyses of a full set of devices within the memory cell over variations of circuit parameters for the full set of devices;
    computing third sensitivities of the operational performance variables to said variations of the memory cell circuit parameters within the full set of devices; and
    comparing the third sensitivities to a threshold criteria to select the subsets of parameters as those parameters for which a corresponding operational performance variable has a greater third sensitivity than the third sensitivity of other parameters within the parameters for the full set of devices.

3. The method of claim 2, further comprising performing the multiple statistical analyses, the computing and comparing on multiple cell designs of differing order and further comprising selecting one or more of the multiple cell designs for further analysis by determining which of the multiple cell designs have lesser values of the third sensitivities.

4. The method of claim 1, further comprising performing the selecting, determining, simulating, repeating and computing on multiple cell designs of differing order and further comprising selecting one or more of the multiple cell designs for further analysis by determining which of the multiple cell designs have lesser values of the first sensitivities.

5. The method of claim 1, further comprising adjusting one or more circuit parameter values within the subsets in conformity with a result of the computing the first sensitivities of the corresponding operational performance variables, whereby design of the memory cell is improved.

6. The method of claim 1, further comprising:
    eliminating one or more circuit parameters from one or more of the subsets in conformity with a result of the computing; and
    second repeating the determining, simulating, repeating and computing, wherein the second repeating is performed for the one or more subsets having a reduced number of parameters, and wherein the values of the eliminated circuit parameters are set to fixed values during the second repeating.

7. The method of claim 1, wherein the plurality of performance variables includes write stability and read stability, and wherein the simulating simulates the memory cell for each of write stability, write delay, read stability and read delay over the values of the circuit parameters within the corresponding subsets.

8. A workstation computer system comprising a processor for executing program instructions and a memory coupled to the processor for storing program instructions, the program instructions including program instructions for characterizing a design of a memory cell, the program instructions comprising program instructions for:
    pre-selecting subsets of circuit parameters of memory cell circuit elements, wherein the subsets correspond to a plurality of operational performance variables describing performance of the memory cell, wherein the subsets are pre-selected according to an expectation that first sensitivities of the operational performance variables to changes in the circuit parameters within their corresponding subsets are greater than second sensitivities of the performance variables with respect to changes in other circuit parameters that are not included in their corresponding subsets;
    determining values of statistical descriptors, including at least mean values, for the associated circuit parameters for simulation by a simulation program within a computer system;
    statistically simulating, by the computer program, the operational performance variables using the values of the statistical descriptors;
    repeatedly executing the program instructions for statistically simulating, while systematically varying the circuit parameters in the corresponding subsets by adjusting their associated mean values and while maintaining the mean values associated with the circuit parameters that are not included within the subsets at fixed values across the multiple repetitions of the statistically simulating until the circuit parameters have been varied across corresponding predetermined ranges;
    computing the first sensitivities of the operational performance variables to the systematic variations of the mean values of the memory cell circuit parameters within their corresponding subsets from results of the statistically simulating by computing measures of partial derivatives of variations of the corresponding operational performance variables to the variations of the mean values of the memory cell circuit parameters; and
    storing the computed sensitivities in a memory of the computer system.

9. The workstation computer system of claim 8, wherein the program instructions for pre-selecting further comprise program instructions for:

performing multiple statistical analyses of a full set of devices within the memory cell over variations of circuit parameters for the full set of devices;

computing third sensitivities of the operational performance variables to said variations of the memory cell circuit parameters within the full set of devices; and comparing the third sensitivities to a threshold criteria to select the subsets of parameters as those parameters for which a corresponding operational performance variable has a greater third sensitivity than the third sensitivity of other parameters within the parameters for the full set of devices.

10. The workstation computer system of claim 9, wherein the program instructions for performing the multiple statistical analyses, the computing and comparing are executed for multiple cell designs of differing order and further comprising program instructions for selecting one or more of the multiple cell designs for further analysis by determining which of the multiple cell designs have lesser values of the third sensitivities.

11. The workstation computer system of claim 8, wherein the program instructions for selecting, determining, simulating, repeatedly executing, and computing are executed for multiple cell designs of differing order and further comprising program instructions for comprising selecting one or more of the multiple cell designs for further analysis by determining which of the multiple cell designs have lesser values of the first sensitivities.

12. The workstation computer system of claim 8, further comprising program instructions for adjusting one or more circuit parameter values within the subsets in conformity with a result of the computing the first sensitivities of the corresponding operational performance variables, whereby design of the memory cell is improved.

13. The workstation computer system of claim 8, further comprising program instructions for:
eliminating one or more circuit parameters from one or more of the subsets in conformity with a result of the computing; and
second repeatedly executing the program instructions for determining, simulating, repeatedly executing and computing, wherein the second repeatedly executing is performed for the one or more subsets having a reduced number of parameters, and wherein the values of the eliminated circuit parameters are set to fixed values during repetitions of the simulating.

14. The workstation computer system of claim 8, wherein the plurality of performance variables includes write stability and read stability, and wherein the simulating simulates the memory cell for each of write stability, write delay, read stability and read delay over the values of the circuit parameters within the corresponding subsets.

15. A computer program product comprising non-transitory computer-readable media storing program instructions for execution on a workstation computer, the program instructions for characterizing a design of a memory cell, the program instructions comprising program instructions for:
pre-selecting subsets of circuit parameters of memory cell circuit elements, wherein the subsets correspond to a plurality of operational performance variables describing performance of the memory cell, wherein the subsets are pre-selected according to an expectation that first sensitivities of the operational performance variables to changes in the circuit parameters within their corresponding subsets are greater than second sensitivities of the performance variables with respect to changes in other circuit parameters that are not included in their corresponding subsets;

determining values of statistical descriptors, including at least mean values, for the associated circuit parameters for simulation by a simulation program within a computer system;

statistically simulating, by the computer program, the operational performance variables using the values of the statistical descriptors;

repeatedly executing the program instructions for statistically simulating, while systematically varying the circuit parameters in the corresponding subsets by adjusting their associated mean values and while maintaining the mean values associated with the circuit parameters that are not included within the subsets at fixed values across the multiple repetitions of the statistically simulating until the circuit parameters have been varied across corresponding predetermined ranges;

computing the first sensitivities of the operational performance variables to the systematic variations of the mean values of the memory cell circuit parameters within their corresponding subsets from results of the statistically simulating by computing measures of partial derivatives of variations of the corresponding operational performance variables to the variations of the mean values of the memory cell circuit parameters; and storing the computed sensitivities in the memory.

16. The computer program product of claim 15, wherein the program instructions for pre-selecting further comprise program instructions for:
performing multiple statistical analyses of a full set of devices within the memory cell over variations of circuit parameters for the full set of devices;
computing third sensitivities of the operational performance variables to said variations of the memory cell circuit parameters within the full set of devices; and
comparing the third sensitivities to a threshold criteria to select the subsets of parameters as those parameters for which a corresponding operational performance variable has a greater third sensitivity than the third sensitivity of other parameters within the parameters for the full set of devices.

17. The computer program product of claim 16, wherein the program instructions for performing the multiple statistical analyses, the computing and comparing are executed for multiple cell designs of differing order and further comprising program instructions for selecting one or more of the multiple cell designs for further analysis by determining which of the multiple cell designs have lesser values of the third sensitivities.

18. The computer program product of claim 15, wherein the program instructions for selecting, determining, simulating, repeatedly executing and computing are executed for multiple cell designs of differing order and further comprising program instructions for comprising selecting one or more of the multiple cell designs for further analysis by determining which of the multiple cell designs have lesser values of the first sensitivities.

19. The computer program product of claim 15, further comprising program instructions for adjusting one or more circuit parameter values within the subsets in conformity with a result of the computing the first sensitivities of the corresponding operational performance variables, whereby design of the memory cell is improved.

20. The computer program product of claim 15, further comprising program instructions for:
  eliminating one or more circuit parameters from one or more of the subsets in conformity with a result of the computing; and
  second repeatedly executing the program instructions for the determining, simulating, repeatedly executing and computing, wherein the second repeatedly executing is performed for the one or more subsets having a reduced number of parameters, and wherein the values of the eliminated circuit parameters are set to fixed values during repetitions of the simulating.

* * * * *